(12) United States Patent
Hundemer

(10) Patent No.: US 10,494,121 B2
(45) Date of Patent: Dec. 3, 2019

(54) TETHERED UNMANNED AERIAL VEHICLE SYSTEM

(71) Applicant: Tribune Broadcasting Company, LLC, Chicago, IL (US)

(72) Inventor: Hank J. Hundemer, Bellevue, KY (US)

(73) Assignee: Tribune Boradcasting Company, LLC, Chicago, IL (US)

( * ) Notice: Subject to any disclaimer, the term of this patent is extended or adjusted under 35 U.S.C. 154(b) by 0 days.

(21) Appl. No.: 16/168,352

(22) Filed: Oct. 23, 2018

(65) Prior Publication Data

US 2019/0055036 A1 Feb. 21, 2019

Related U.S. Application Data

(63) Continuation of application No. 15/210,072, filed on Jul. 14, 2016, now Pat. No. 10,138,002.

(Continued)

(51) Int. Cl.
| | | |
|---|---|---|
| *B64F 1/02* | (2006.01) | |
| *B64C 39/02* | (2006.01) | |
| *B64F 3/00* | (2006.01) | |

(52) U.S. Cl.
CPC .............. *B64F 1/02* (2013.01); *B64C 39/022* (2013.01); *B64C 39/024* (2013.01); *B64F 3/00* (2013.01);

(Continued)

(58) Field of Classification Search
CPC ................ B64C 39/022; B64C 39/024; B64C 2201/182; B64C 2201/148;

(Continued)

(56) References Cited

U.S. PATENT DOCUMENTS 3,149,803 A * 9/1964 Petrides ................ B64C 39/022
244/17.13
8,646,719 B2 * 2/2014 Morris .................... B64C 27/02
244/1 TD (Continued)

FOREIGN PATENT DOCUMENTS

| WO | WO 2007/141795 A1 | 12/2007 |
| WO | WO 2013/162128 A1 | 10/2013 |

OTHER PUBLICATIONS

International Search Report issued in co-pending International Patent Application No. PCT/US2017/012057, Korean Patent Office (ISA/KR), dated Apr. 21, 2017, 3 pages.

(Continued)

*Primary Examiner* — Valentina Xavier
(74) *Attorney, Agent, or Firm* — McDonnell Boehnen Hulbert & Berghoff LLP

(57) ABSTRACT

In one aspect, an example system includes: (i) a base including a bottom surface and a first coupling-point; (ii) a vertically-oriented elongate structure comprising a lower end, an upper end, and an inner channel, wherein the inner channel comprises an upper access-point disposed proximate the upper end, wherein the base is coupled to the elongate structure proximate the lower end; (iii) a deployable cushioning-device coupled to the elongate structure; and (iv) a tether comprising a first portion, a second portion, a third portion, and a fourth portion, wherein the first portion is coupled to the first coupling-point, the second portion is coupled to a second coupling-point of the UAV, the third portion extends through the inner channel, the fourth portion extends from the upper access-point to the second coupling-point, and the fourth portion has a length that is less than a distance between the upper access-point and the bottom surface.

20 Claims, 4 Drawing Sheets

Related U.S. Application Data

(60) Provisional application No. 62/273,728, filed on Dec. 31, 2015.

(52) U.S. Cl.
CPC .. *B64C 2201/148* (2013.01); *B64C 2201/182* (2013.01)

(58) Field of Classification Search
CPC . B64C 2201/208; B64D 2201/00; B64F 3/00; B64F 1/02; B64F 3/02
See application file for complete search history.

(56) References Cited

U.S. PATENT DOCUMENTS

| | | | | |
|---|---|---|---|---|
| 9,786,105 | B2* | 10/2017 | Moloney | G07C 5/0841 |
| 2005/0017129 | A1* | 1/2005 | McDonnell | B64C 25/68 244/110 G |
| 2012/0112008 | A1* | 5/2012 | Holifield | B64C 27/02 244/155 A |
| 2012/0187243 | A1* | 7/2012 | Goldie | B64C 39/024 244/110 C |
| 2013/0134254 | A1 | 5/2013 | Moore | |
| 2013/0233964 | A1* | 9/2013 | Woodworth | B64C 37/02 244/2 |
| 2015/0041598 | A1* | 2/2015 | Nugent | H02J 17/00 244/53 R |
| 2015/0054282 | A1* | 2/2015 | Goldstein | F03D 5/00 290/44 |
| 2015/0097086 | A1* | 4/2015 | Schaefer | B64C 39/022 244/175 |
| 2015/0102154 | A1* | 4/2015 | Duncan | B64C 39/022 244/2 |
| 2015/0158586 | A1* | 6/2015 | Hachtmann | B64C 39/022 244/110 C |
| 2015/0180186 | A1 | 6/2015 | Vander Lind et al. | |
| 2016/0167805 | A1* | 6/2016 | McKee | B60P 3/11 244/2 |
| 2016/0200437 | A1* | 7/2016 | Ryan | B64C 39/022 244/99.2 |
| 2016/0311556 | A1* | 10/2016 | Knudsen | B64G 5/00 |
| 2016/0318607 | A1* | 11/2016 | Desai | B64D 1/16 |
| 2017/0129624 | A1* | 5/2017 | Chavez, Jr. | B64F 1/02 |
| 2017/0190444 | A1* | 7/2017 | Hundemer | B64C 39/022 |
| 2018/0022310 | A1* | 1/2018 | Olson | B64C 25/56 244/100 A |

OTHER PUBLICATIONS

Written Opinion issued in co-pending International Patent Application No. PCT/US2017/012057, Korean Patent Office (ISA/KR), dated Apr. 21, 2017, 10 pages.

* cited by examiner

TETHERED UNMANNED AERIAL VEHICLE SYSTEM

RELATED DISCLOSURE

This disclosure is a continuation of U.S. patent application Ser. No. 15/210,072 filed on Jul. 14, 2016, and claims priority to U.S. Provisional Pat. App. No. 62/273,728 filed on Dec. 31, 2015, both of which are hereby incorporated by reference in their entirety.

USAGE AND TERMINOLOGY

In this disclosure, unless otherwise specified and/or unless the particular context clearly dictates otherwise, the terms "a" or "an" mean at least one, and the term "the" means the at least one.

BACKGROUND

Unless otherwise specified, the materials described in this section are not prior art to the claims in this disclosure and are not admitted to be prior art by inclusion in this section.

Advancements in technology and computing have contributed to a recent increase in the development and overall use of unmanned aerial vehicles (UAVs). A UAV is an aircraft that can operate without an on-board human operator. Sometimes referred to as a "drone" or an "unmanned aerial system," a UAV can take various forms, such as a helicopter, quadcopter, fixed-wing aircraft, blimp, or glider, and can be used for various applications, such as capturing an image or video of an area from an aerial perspective.

A UAV can operate in one or more modes, such as a remote-control mode, an autonomous mode, or a semi-autonomous mode. While the UAV is operating in a remote-control mode, a remotely-located operator can operate the UAV. While the UAV is operating in an autonomous mode, a computing system onboard the UAV can operate the UAV. Finally, while the UAV is operating in a semi-autonomous mode, a remotely-located operator can cause the UAV to perform some operations, and a computing system onboard the UAV can cause the UAV to perform other operations. For instance, the operator can instruct the UAV to navigate to a particular location, and the computing system can cause the UAV to autonomously navigate to that location.

SUMMARY

In one aspect, an example system is disclosed. The system includes: a base comprising a bottom surface and a first coupling-point; a vertically-oriented elongate structure comprising a lower end, an upper end, and an inner channel, wherein the inner channel comprises an upper access-point disposed proximate the upper end, wherein the base is coupled to the elongate structure proximate the lower end; a UAV comprising a second coupling-point; and a tether comprising a first portion, a second portion, a third portion, and a fourth portion, wherein (i) the first portion is coupled to the first coupling-point, (ii) the second portion is coupled to the second coupling-point, (iii) the third portion extends through the inner channel, (iv) the fourth portion extends from the upper access-point to the second coupling-point, and (v) the fourth portion has a length that is less than a distance between the upper access-point and the bottom surface.

In another aspect, an example system for use with a UAV is disclosed. The system includes: a base comprising a first coupling-point; a vertically-oriented elongate structure comprising a lower end, an upper end, and an inner channel, wherein the inner channel comprises an upper access-point disposed proximate the upper end, wherein the base is coupled to the elongate structure proximate the lower end; a landing structure constructed and arranged for receiving the UAV, wherein the landing structure is coupled to the elongate structure proximate the upper end; and a tether comprising a first portion, a second portion, a third portion, and a fourth portion, wherein (i) the first portion is coupled to the first coupling-point, (ii) the second portion is coupled to a second coupling-point of the UAV, (iii) the third portion extends through the inner channel, and (iv) the fourth portion extends from the upper access-point to the second coupling-point.

In a further aspect, another example system for use with a UAV is disclosed. The system includes: a base comprising a bottom surface and a first coupling-point; a vertically-oriented elongate structure comprising a lower end, an upper end, and an inner channel, wherein the inner channel comprises an upper access-point disposed proximate the upper end, wherein the base is coupled to the elongate structure proximate the lower end; a landing structure constructed and arranged for receiving the UAV, wherein the landing structure is coupled to the elongate structure proximate the upper end; and a tether comprising a first portion, a second portion, a third portion, and a fourth portion, wherein (i) the first portion is coupled to the first coupling-point, (ii) the second portion is coupled to a second coupling-point of the UAV, (iii) the third portion extends through the inner channel to the upper access-point, (iv) the fourth portion extends from the upper access-point, through the opening, and to the second coupling-point, and (v) the fourth portion has a length that is less than a distance between the upper access-point and the bottom surface.

In yet another aspect, an example system for use with a UAV is disclosed. The UAV includes: a base comprising a bottom surface and a first coupling-point; a vertically-oriented elongate structure comprising a lower end, an upper end, and an inner channel, wherein the inner channel comprises an upper access-point disposed proximate the upper end, wherein the base is coupled to the elongate structure proximate the lower end; a deployable cushioning-device coupled to the elongate structure; a tether comprising a portion that extends from the upper access-point to the UAV, the portion having a length that is less than a distance between the upper access-point and the bottom surface; and a computing system configured for performing a set of acts comprising: detecting abnormal operation of the UAV; and responsive to detecting abnormal operation of the UAV, causing the deployable cushioning-device to deploy.

In another aspect, an example non-transitory computer-readable medium for use with a system is disclosed. The system includes: a base comprising a bottom surface and a first coupling-point; a vertically-oriented elongate structure comprising a lower end, an upper end, and an inner channel, wherein the inner channel comprises an upper access-point disposed proximate the upper end, wherein the base is coupled to the elongate structure proximate the lower end; a deployable cushioning-device coupled to the elongate structure; and a tether comprising a portion that extends from the upper access-point to the UAV, the portion having a length that is less than a distance between the upper access-point and the bottom surface. The example non-transitory computer-readable medium has stored thereon program instructions that when executed cause performance of a set of acts comprising: detecting abnormal operation of the UAV; and responsive to detecting abnormal operation of the UAV, causing the deployable cushioning-device to deploy.

In another aspect, an example method for use with a system is disclosed. The system includes: a base comprising a bottom surface and a first coupling-point; a vertically-oriented elongate structure comprising a lower end, an upper end, and an inner channel, wherein the inner channel comprises an upper access-point disposed proximate the upper end, wherein the base is coupled to the elongate structure proximate the lower end; a deployable cushioning-device coupled to the elongate structure; and a tether comprising a portion that extends from the upper access-point to the UAV, the portion having a length that is less than a distance between the upper access-point and the bottom surface. The example method includes: detecting abnormal operation of the UAV; and responsive to detecting abnormal operation of the UAV, causing the deployable cushioning-device to deploy.

In a further aspect, an example system for use with a UAV is disclosed. The example system includes: a base comprising a bottom surface and a first coupling-point; a vertically-oriented elongate structure comprising a lower end, an upper end, and an inner channel, wherein the inner channel comprises an upper access-point disposed proximate the upper end, wherein the base is coupled to the elongate structure proximate the lower end; a cushion-component coupled to the elongate structure; and a tether comprising a portion that extends from the upper access-point to the UAV, the portion having a length that is less than a distance between the upper access-point and the bottom surface.

DETAILED DESCRIPTION

I. Overview

Figure 1:
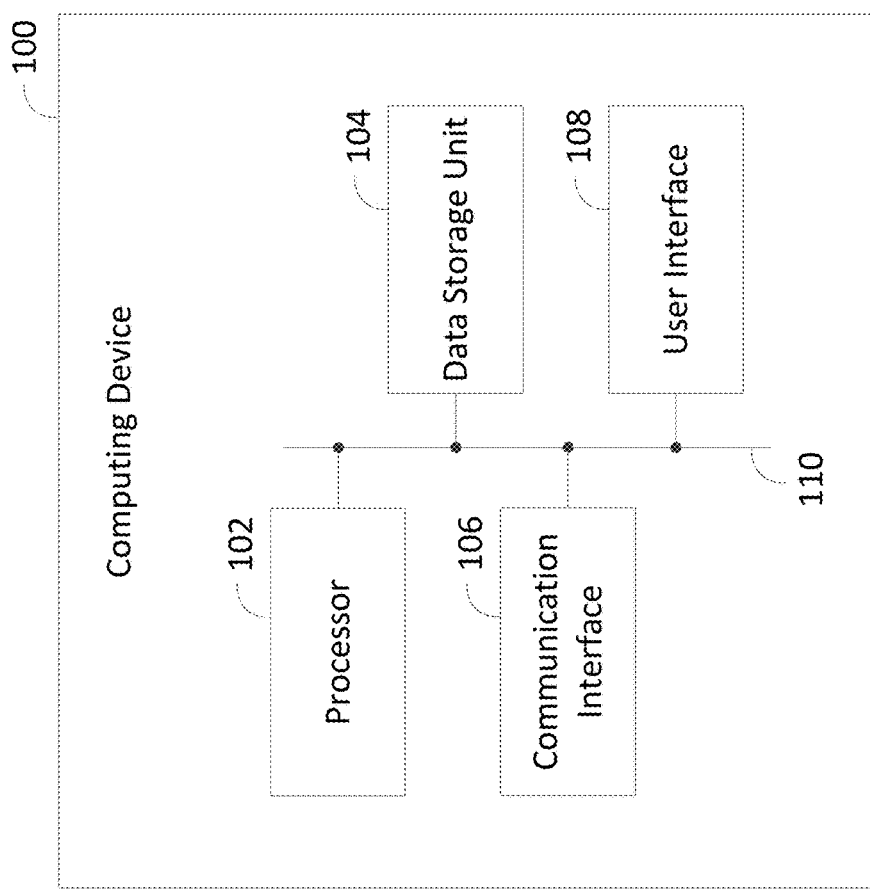
FIG. 1 is a simplified block-diagram of an example computing device.

As discussed above, a UAV can fly without an onboard human operator. In some instances though, a UAV can malfunction and lose the ability to fly properly. As a result, the UAV can fall to the ground and crash, which can potentially injure a person or damage property. Disclosed herein is a tethered UAV system that can help avoid such injuries and/or damages.

In one example, a tethered UAV system can have a base with a vertically-oriented elongate structure that positions a portion of a tether connected to a UAV at a height that can limit a position of the tethered UAV. Within the system, the tether can extend from the base up through an inner channel of the vertically-oriented elongate structure and connect to a UAV from the top of the elongate structure. As a result, the tether can limit the distance that the UAV can fly away from the top of the elongate structure. Thus, the tether may constrain the UAV to a volume centered at the top of the elongate structure and extending radially outward by an extent defined by the tether. In some instances, the tether can have a portion of the tether extending from the top of the elongate structure to the UAV can have a length that is less than the height of the elongate structure, which can enable the tether to reduce the chance of the UAV reaching people or objects on the ground nearby. With this arrangement, even if the UAV malfunctions and loses the ability to fly property, rather than crashing into the ground, the combination of the elongate structure and tether can cause the UAV to swing like a pendulum from atop the elongate structure, and potentially miss hitting people or objects.

As discussed above, a tethered UAV system can limit a UAV from reaching the ground. Given this, the UAV may be unable to land on the ground. However, disclosed herein is a tethered UAV system that can help enable a tethered UAV to land somewhere else. In one example, a tethered UAV system can include a landing structure that is configured and arranged to receive the tethered UAV. The landing structure can provide a platform for the UAV to land and can have various configurations, such as a bowl-shaped portion constructed to catch a tethered UAV during landing. In some examples, the landing structure is connected near the upper end of the elongate structure and can also serve as a take-off platform for the tethered UAV to initiate flight.

Additionally, UAVs can be costly and often carry expensive equipment (e.g., cameras, sensors). Although a tethered UAV system can help reduce a tethered UAV from colliding with property located on the ground, the tether can still cause the UAV to swing into the vertically-oriented elongate structure as a result of a malfunction of the UAV, which can damage the UAV or equipment located on the UAV. Disclosed herein is a tethered UAV system that can help avoid such damage.

In an example, a tethered UAV system can include a deployable cushioning-device positioned on the outer surface of the vertically-oriented elongate structure. The deployable cushioning-device can help absorb the impact of a collision between the tethered UAV and the elongate structure and potentially reduce damage to the UAV. In some instances, a cushioning-device can have a deployable configuration that enables a computing system operating in the tethered UAV system to detect abnormal operation of the UAV and to cause the deployable cushioning-device to deploy in response. In this way, a deployable cushioning-device can stay stored in a position on the elongate structure and deploy in a manner similar to an air-bag (e.g., by inflating) to potentially reduce damage to the UAV and/or the elongate structure during a collision.

II. Example Architecture

A. Computing Device

FIG. 1 is a simplified block-diagram of an example computing device 100 that can perform various acts and/or functions, such as those described in this disclosure. Computing device 100 can include various components, such as processor 102, data storage unit 104, communication interface 106, and/or user interface 108. The components can be connected to each other (or to another device, system, or other entity) via connection mechanism 110.

In this disclosure, the term "connection mechanism" means a mechanism that facilitates communication between two or more devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

Computing device 100 can take various forms, such as a workstation terminal, a desktop computer, a laptop, a tablet, and/or a mobile phone.

B. Tethered UAV System

Figure 2:
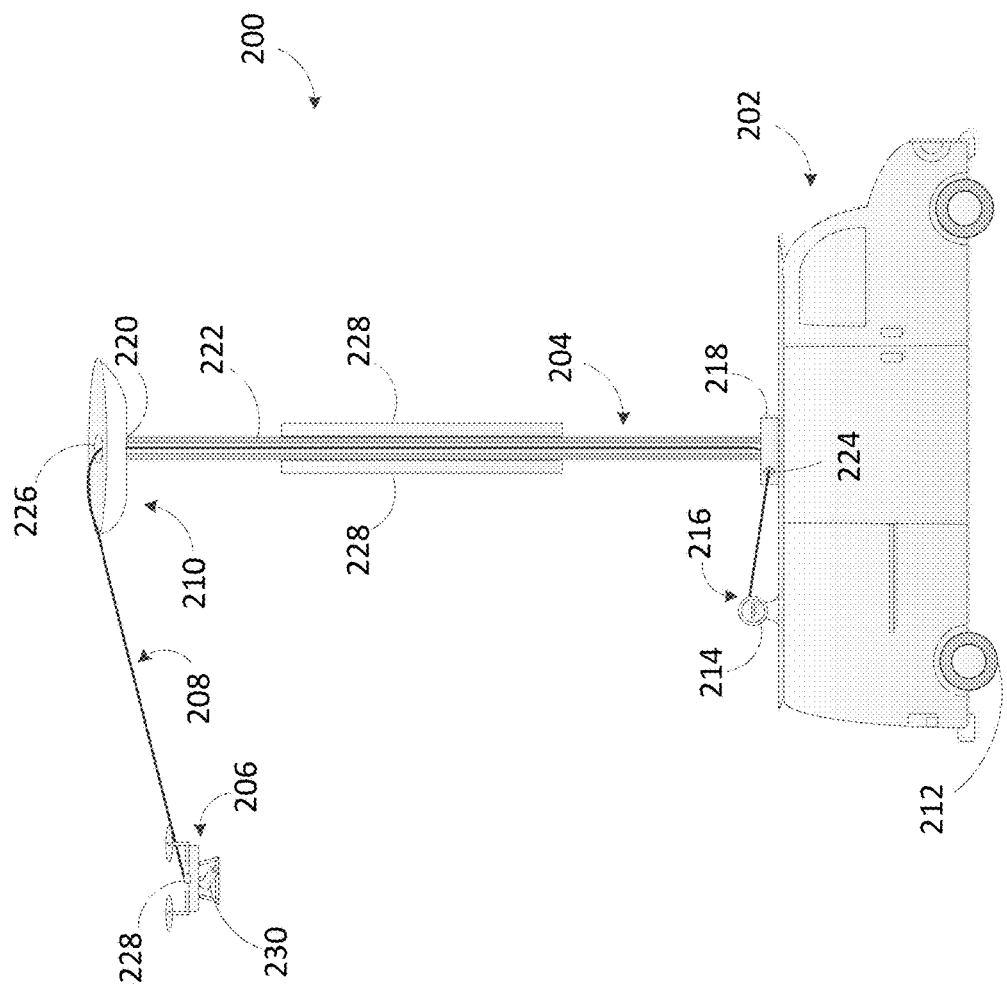
FIG. 2 is an illustration of an example UAV system.

FIG. 2 is an illustration of an example UAV system 200. System 200 includes base 202, elongate structure 204, UAV 206, tether 208, and landing structure 210, but can also include more or less components within examples. For instance, system 200 can include components not shown in FIG. 2, such as a computing system in or on base 202. In this disclosure, the term "computing system" means a system that includes at least one computing device. As such, system 200 can be configured to perform various acts and/or functions, including those described in this disclosure (including in the accompanying drawings) in accordance with a set of instructions specified by such a computing system.

Base 202 is shown as a vehicle in FIG. 2, but can exist in other non-stationary or stationary configurations in some examples. As shown, base 202 includes bottom surface 212, and spooling mechanism 214 configured with first coupling-point 216. Bottom surface 212 corresponds to the bottom of a wheel of base 202 and represents a lower portion of base 202 located adjacent or nearby the ground. In other examples, bottom surface 212 can correspond to other portions of base 202, including portions located farther from the ground.

Spooling mechanism 214 is a mechanical structure coupled to base 202 that can store and adjust a length of tether 208 through automatic or manual means. For example, spooling mechanism 208 may include a reel that rotates to either wind the tether 208 around the reel, and thereby decrease the length of the portion of the tether 208 that is not wound around the reel, or unwind the tether 208, and thereby increase the length of the portion of the tether 208 that is not wound around the reel. Tether 208 is connected to spooling mechanism 214 at first coupling-point 216. As such, spooling mechanism 214 can be configured to automatically adjust the length of tether 208 via mechanical operation based on user input or can also enable a human operator to manually adjust tether 208 (e.g., by winding/unwinding the spooling mechanism via rotation of a handle or by causing an electric motor to operate so as to engage the spooling mechanism and effect such winding/unwinding). In some instances, spooling mechanism 214 can also serve as storage for tether 208 during navigation by base 202. Moreover, in some examples, the tether 208 may connect to base 202 at other positions (e.g., directly to base 202).

In some examples, base 202 can have other components, such as a power source and communication components. For instance, UAV 206 can communicate and receive power from components positioned on base 202 through tether 208.

As shown in FIG. 2, elongate structure 204 can be a vertically-oriented adjustable mast coupled to base 202. The elongate structure is shown in FIG. 2 in a cutaway form that illustrates the interior of elongate structure 204. As an adjustable mast, elongate structure 204 can change orientation and position, extend upward, adjust angle of orientation, and collapse into a storable position using pneumatics, for example. In other examples, elongate structure 204 can have other configurations, such as multiple structures (e.g., poles) connected to base 202. Elongate structure 204 connects to base 202 at lower end 218 and extends in a vertical orientation from base 202 with upper end 220 of elongate structure 204 positioned opposite of lower end 218. Additionally, elongate structure 204 can include inner channel 222 with lower access-point 224 to inner channel 222 disposed proximate lower end 218, and upper access-point 226 of inner channel 222 disposed proximate upper end 220. Upper-access point 226 is shown having a circular opening to enable full rotation of tether 208 as UAV 206 navigates an environment in various directions, but can have other configurations in some examples.

As shown in FIG. 2, tether 208 may be routed through the inner channel 222 of elongate structure 204. Thus, tether 208 may enter the lower access-point 224, pass through inner channel 222 and exit through upper access-point 226. As such, the spooling mechanism 214 may be situated exterior to the elongate structure 204 (e.g., mounted to base 202 proximate the lower end 218 of the elongate structure 204, as shown in FIG. 2). However, in some examples, the spooling mechanism may be mounted at other locations. For example, the spooling mechanism may be situated within the base 202 or within the elongate structure 204 itself. As such, the lower access-point 224 may not provide access to the inner channel 222 from an exterior of the base 202. For instance, if the spooling mechanism 214 is mounted within the base 202, below the lower end 218 of the elongate structure 204, an access point to the inner channel 222 may be provided that is interior to the base 202 to thereby provide a path for the tether to pass between the such an interior-mounted spooling mechanism and the inner channel 222 of the elongate structure 204. Moreover, in some cases, the spooling mechanism may be disposed within the elongate structure 204 itself, in which case the inner channel 222 may only extend between the upper access-point 226 and the location of such a spooling mechanism. Further, in an example in which the spooling mechanism is situated proximate the upper end 220 of the elongate structure 204, the tether 208 may not pass through the inner channel 222 at all. In any of these configurations, operation of the spooling mechanism 214 to wind/unwind the tether 208 can be used to control the length of the tether 208 that extends from proximate the top end 220 of the elongate structure 204 (e.g., at the upper access-point 226) to the UAV 206, and thereby limit the maximum separation distance between the top end 220 of the elongate structure 204 and the UAV 206.

Elongate structure 204 further includes deployable cushioning-device 228 connected to an outer surface of elongate structure 204. Deployable cushioning-device 228 can potentially reduce damage to UAV 206 and/or elongate structure 204 in the event UAV 206 collides with elongate structure 204. For example, if UAV 206 ceases normal flying operations (e.g., due to a malfunction) the tether 208 may cause the UAV 206 to swing into the elongate structure 204. For instance, a computing system of system 200 can detect abnormal operation of tethered UAV 206 and cause deployable cushioning-device 228 to inflate using a gaseous substance in response. The deployable cushioning-device 228 may inflate by changing from having a first volume of gaseous substance inside to having a second volume of gaseous substance with the second volume being greater than the first volume. The deployable cushioning-device 228 can include a set of deployable cushioning components that together extend around the outer surface of elongate structure 204 at various positions, for example. In some examples, elongate structure 204 can include cushioning components that do not require inflating or other type of preparation by system 200 before use. For instance, stationary cushioning components may be mounted on the exterior surface of elongate structure 204.

To help allow deployable cushioning-device 204 to provide such functionality, deployable cushioning-device 204 can be positioned on the elongate structure 204 at a height such that a length of the fourth portion 240 is greater than or equal to a first distance between the upper access-point 226 and an upper end 246 of the deployable cushioning-device 228, and is also less than or equal to a second distance between the upper access-point 226 and a lower end 248 of the deployable cushioning-device 228.

System 200 further includes UAV 206 tethered to base 202 via tether 208. UAV 206 can be any type of aircraft capable of operation without an on-board human operator. For instance, in some examples, a human operator can control navigation of UAV 206 via a physically separate remote control that can provide control instructions to UAV 206 via a wired or wireless connection. As shown in FIG. 2, UAV 206 can be configured with second coupling-point 228 that serves as the connection point for connecting tether 208 to UAV 206. Within examples, second coupling-point 228 can have various locations on UAV 206, which can depend on the configuration of UAV 206. As such, UAV 206 can have various configurations, such as a helicopter, quadcopter, fixed-wing aircraft, blimp, or glider, and can operate in various modes, such as a remote-control mode, an autonomous mode, or a semi-autonomous mode.

UAV 206 can include camera 230 configured to capture video and/or images from an aerial perspective. UAV 206 can include other components, such as a power source (e.g., battery) and a computing system located on-board. In some examples, UAV 206 can also be configured to receive power from a power source located on base 202 through a power-distribution connection positioned within tether 208. This can enable UAV 206 to have a reduced weight since an on-board battery is not required. During operation, UAV 206 can transmit and receive communications, such as sensor data, images, video, and control instructions, using tether 208 or through a wireless connection with another computing system, such as the computing system of base 202.

System 200 includes tether 208 that serves as a connecting link between base 202 and UAV 206. Tether 208 can include various materials, including materials that enable elastic extension as well as materials that enable transfer of electrical power or communications between the computing systems of base 202 and UAV 206. In some examples, tether 208 can include multiple components constructed together.

Figure 3:
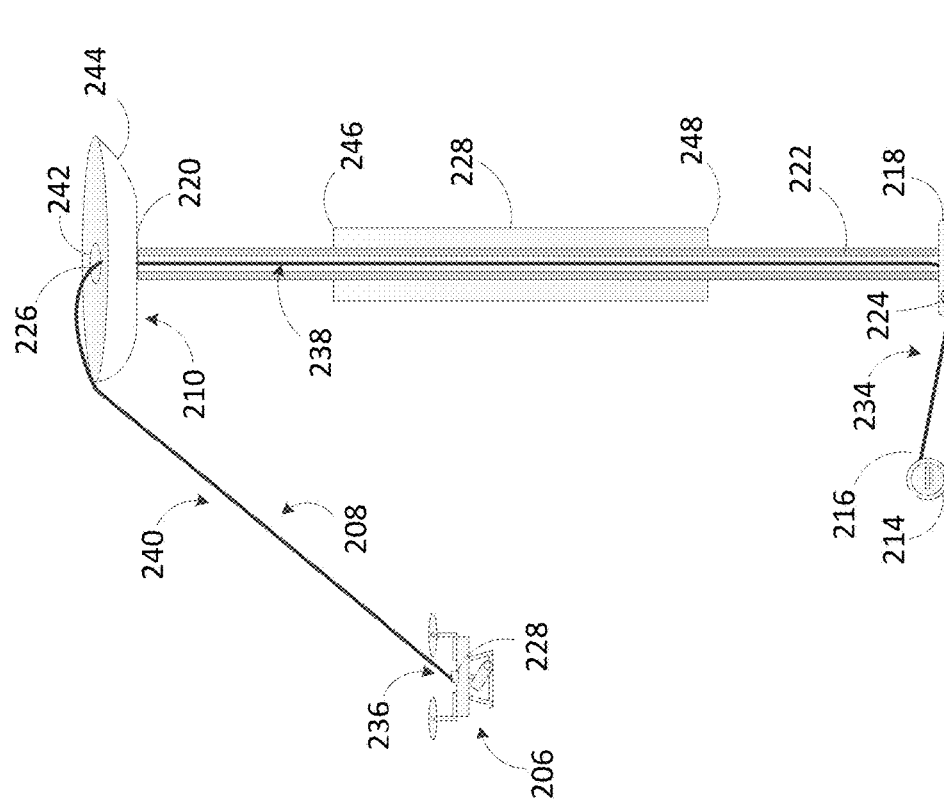
FIG. 3 is another illustration of the example UAV system.

Referring to FIG. 3, tether 208 is divided into first portion 234, second portion 236, third portion 238, and fourth portion 240. First portion 234 of tether 208 extends from first coupling-point 216 into lower access point 224, and second portion 236 is the portion of tether 208 that connects to UAV 206 at second coupling point 228. Although, tether 208 can connect to base 202 and UAV 206 at different positions. For instance, first portion 234 of tether 208 can connect directly to base 202 without spooling mechanism 214. Third portion 238 of tether 208 starts from lower access-point 224 and extends through inner channel 222 of elongate structure 204 to the upper access-point 226 of elongate structure 204. The fourth portion 240 of tether 208 extends from upper access-point 226 of elongate structure 204 to second portion 236 of tether 208 positioned at second coupling-point 228 on UAV 206.

In some examples, fourth portion 240 of tether 208 can have a length that is less than a distance between upper access-point 226 of elongate structure 204 and bottom surface 212 of base 202. At this length or shorter, tether 208 can suspend UAV 206 above the ground as a result of a malfunction of UAV 206 during flight. As noted elsewhere, the length of the fourth portion 240 may be controlled via operation of the spooling mechanism 214 to wind/unwind the tether 208.

System 200 can further include landing structure 210 that is constructed and arranged for receiving UAV 206. Landing structure 210 can provide a structure for UAV 206 to land and also serve as a take-off platform for UAV 206 to initiate flight, for example. As shown in FIG. 2, landing structure 210 can be connected proximate upper end 220 of elongate structure 204. As shown in FIG. 3, landing structure 210 can include opening 242 that enables tether 208 (or any portion thereof) to extend through landing structure 210. In some examples, opening 242 can have a circular configuration to enable full rotation of tether 208 during UAV 206 operation and can also be positioned proximate to upper access-point 226 of elongate structure 204.

Landing structure 210 is shown having a bowl-shaped portion 244 constructed and arranged for receiving UAV 206, but can have other configurations in some examples. Bowl-shaped portion 244 can include mesh or nylon netting, for example, to assist in catching a landing UAV 206. In one example, landing structure 210 can have a net disposed around a perimeter of landing structure 210. In other examples, landing structure 210 can include other structures and materials, such as combinations of hard and soft materials. For instance, landing structure 210 can have collapsible portions that can collapse and extend outward as controlled by the computing system of system 200.

As shown, landing structure 210 can be mounted to elongate structure 204 so as to entirely surround the outer sidewall surface of the elongate structure 204 near the top end 220. However, in some examples, the landing structure 210 may be positioned adjacent a portion of the outer sidewall surface without entirely surrounding the elongate structure 204.

Landing structure 210 can also include a coupling portion that extends around the upper end 220 of the elongate structure 204 to facilitate coupling the landing structure 210 to the elongate structure 204. The coupling portion can take various forms. For example, the coupling portion can be a lip that engages a corresponding recess on the elongate structure 204. However, other coupling techniques can be used as well.

III. Example Operations

The system 200 and/or components thereof can perform various acts. These acts and related features will now be described. A computing system of system 200 can monitor and detect when UAV 206 is operating abnormally during operation. In response to detecting this, the computing system can initiate actions, such as causing the deployable cushioning-device 228 to inflate or preparing landing structure 210 for use. For example, computing system can interpret abnormal operation of UAV 206 as a potential malfunction by UAV 206 and can cause the deployable cushioning-device positioned on elongate structure 204 to deploy by expanding with a gaseous substance.

In an example, system 200 can include sensors configured to measure tension of tether 208 during operation of UAV 206. Based on the measured tension level of tether 208, the computing system of system 200 can determine that UAV 206 is operating abnormally or preparing to execute a landing. In response, UAV 206 can cause deployable cushioning-device 228 positioned on elongate structure 204 to deploy. Similarly, the computing system can also perform other operations based on the measured tension level of tether 208. For example, the computing system of system 200 can cause a collapsible portion of landing structure 210 to extend outward in order to prepare for the landing of UAV 206 or adjust a length of tether 208 using spooling mechanism 214.

In another example, the computing system of system 200 can receive sensor data from a sensor of UAV 206 that provides information regarding operation of UAV 206. The computing system can make a determination that the received sensor data has a particular property, and detect abnormal operation of UAV 206 based on the determination. Likewise, the computing system can determine other information regarding UAV 206 from sensor data received from sensors of UAV 206. For example, the computing system can receive an indication from UAV 206 that UAV 206 is decreasing in elevation and prepare for a landing by UAV 206. Likewise, computing system can receive sensor data indicating that UAV 206 is running low on battery power. In the above situations and other possible scenarios, the computing system can cause one or multiple deployable cushioning-devices to deploy as well as cause other components of system 200 to perform operations (e.g., prepare landing structure 210).

Figure 4:
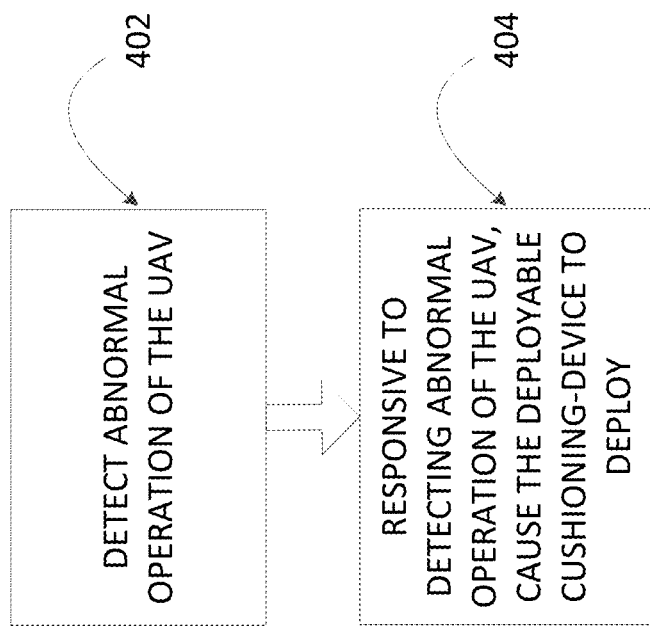
FIG. 4 is a flow chart of an example method.

FIG. 4 is a flow chart illustrating an example method 400. At block 402, method 400 can include detecting abnormal operation of the UAV. At block 404, method 400 can include responsive to detecting abnormal operation of the UAV, causing the deployable cushioning-device to deploy.

IV. Example Variations

Although some of the acts and/or functions described in this disclosure have been described as being performed by a particular entity, such acts and/or functions can be performed by any entity, such as those described in this disclosure. Further, although the described acts and/or functions have been recited in a particular order, the acts and/or functions need not be performed in the order recited. However, in some instances, it can be desired to perform the acts and/or functions in the order recited. Also, not all of the described acts and/or functions need to be performed to achieve one or more of the benefits provided by this disclosure, and therefore not all acts and/or functions are required.

Although certain variations have been discussed in connection with one or more example of this disclosure, such variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A system for use with an unmanned aerial vehicle (UAV), the system comprising:
   a base;
   a vertically-oriented elongate structure comprising a lower end and an upper end, wherein the elongate structure includes an upper access-point disposed proximate the upper end, wherein the base is coupled to the elongate structure proximate the lower end;
   a deployable cushioning-device coupled to the elongate structure;
   a tether comprising a portion that extends from the upper access-point to the UAV; and
   a computing system configured for performing a set of acts comprising:
      detecting abnormal operation of the UAV; and
      responsive to detecting abnormal operation of the UAV, causing the deployable cushioning-device to deploy.

2. The system of claim 1, wherein the base comprises a vehicle.

3. The system of claim 1, wherein the vertically-oriented elongate structure comprises a mast having an adjustable height.

4. The system of claim 1, wherein the deployable cushioning-device comprises a set of one or more deployable cushioning components, wherein the set extends around an outer surface of the elongate structure.

5. The system of claim 1, wherein detecting abnormal operation of the UAV comprises:
   measuring a tension level of the tether;
   making a determination that the measured tension level is below a threshold tension level; and
   based on the determination, detecting abnormal operation of the UAV.

6. The system of claim 1, wherein detecting abnormal operation of the UAV comprises:
   receiving sensor data from a sensor of the UAV;
   making a determination that the received sensor data has a particular property; and
   based on the determination, detecting abnormal operation of the UAV.

7. The system of claim 1, wherein causing the deployable cushioning-device to deploy comprises:
    causing the deployable cushioning-device to expand with a gaseous substance.

8. The system of claim 1, wherein the portion of the tether has a length that is (i) greater than or equal to a first distance between the upper access-point and an upper end of the deployable cushioning-device, and (ii) less than or equal to a second distance between the upper access-point and a lower end of the deployable cushioning-device.

9. A non-transitory computer-readable medium for use with a system comprising:
    a base;
    a vertically-oriented elongate structure comprising a lower end and an upper end, wherein the elongate structure includes an upper access-point disposed proximate the upper end, wherein the base is coupled to the elongate structure proximate the lower end;
    a deployable cushioning-device coupled to the elongate structure; and
    a tether comprising a portion that extends from the upper access-point to an unmanned aerial vehicle (UAV);
    wherein the non-transitory computer-readable medium has stored thereon program instructions that when executed cause performance of a set of acts comprising:
    detecting abnormal operation of the UAV; and
    responsive to detecting abnormal operation of the UAV, causing the deployable cushioning-device to deploy.

10. The non-transitory computer-readable medium of claim 9, wherein the base comprises a vehicle.

11. The non-transitory computer-readable medium of claim 9, wherein the vertically-oriented elongate structure comprises a mast having an adjustable height.

12. The non-transitory computer-readable medium of claim 9, wherein the deployable cushioning-device comprises a set of one or more deployable cushioning components, wherein the set extends around an outer surface of the elongate structure.

13. The non-transitory computer-readable medium of claim 9, wherein detecting abnormal operation of the UAV comprises:
    measuring a tension level of the tether;
    making a determination that the measured tension level is below a threshold level;
    and
    based on the determination, detecting abnormal operation of the UAV.

14. The non-transitory computer-readable medium of claim 9, wherein detecting abnormal operation of the UAV comprises:
    receiving sensor data from a sensor of the UAV;
    making a determination that the received sensor data has a particular property;
    and
    based on the determination, detecting abnormal operation of the UAV.

15. The non-transitory computer-readable medium of claim 9, wherein causing the deployable cushioning-device to deploy comprises:
    causing the deployable cushioning-device to expand with a gaseous substance.

16. The non-transitory computer-readable medium of claim 9, wherein the portion has a length that is (i) greater than or equal to a first distance between the upper access-point and an upper end of the deployable cushioning-device, and (ii) less than or equal to a second distance between the upper access-point and a lower end of the deployable cushioning-device.

17. A method for use with for use with a system comprising:
    a base;
    a vertically-oriented elongate structure comprising a lower end and an upper end, wherein the elongate structure includes an upper access-point disposed proximate the upper end, wherein the base is coupled to the elongate structure proximate the lower end;
    a deployable cushioning-device coupled to the elongate structure; and
    a tether comprising a portion that extends from the upper access-point to an unmanned aerial vehicle (UAV);
    wherein the method comprises:
    detecting abnormal operation of the UAV; and
    responsive to detecting abnormal operation of the UAV, causing the deployable cushioning-device to deploy.

18. The method of claim 17, wherein the deployable cushioning-device comprises a set of one or more deployable cushioning components, wherein the set extends around an outer surface of the elongate structure.

19. The method of claim 17, wherein the portion has a length that is (i) greater than or equal to a first distance between the upper access-point and an upper end of the deployable cushioning-device, and (ii) less than or equal to a second distance between the upper access-point and a lower end of the deployable cushioning-device.

20. A system for use with an unmanned aerial vehicle (UAV), the system comprising:
    a base;
    a vertically-oriented elongate structure comprising a lower end and an upper end, wherein the elongate structure includes an upper access-point disposed proximate the upper end, wherein the base is coupled to the elongate structure proximate the lower end;
    a cushion-component coupled to the elongate structure; and
    a tether comprising a portion that extends from the upper access-point to the UAV.

* * * * *